United States Patent [19]

Abe et al.

[11] Patent Number: 5,239,379
[45] Date of Patent: Aug. 24, 1993

[54] TELEVISION SIGNAL RECEIVING APPARATUS

[75] Inventors: Yoshio Abe, Kobe; Seiji Sakashita; Ippei Kanno, both of Hirakata; Hiroaki Ozeki, Neyagawa, all of Japan

[73] Assignee: Matsushita Electric Industrial Co., Ltd., Osaka, Japan

[21] Appl. No.: 915,552

[22] Filed: Jul. 20, 1992

[30] Foreign Application Priority Data

Jul. 19, 1991 [JP] Japan .................. 3-179482

[51] Int. Cl.$^5$ .................. H04N 5/44; H04N 7/01; H04N 5/50
[52] U.S. Cl. .................. 358/188; 358/140; 358/191.1
[58] Field of Search ............. 358/140, 188, 191.1

[56] References Cited

U.S. PATENT DOCUMENTS 4,605,950 8/1986 Goldberg et al. ........ 358/191.1
4,800,426 1/1989 Glenn ..................... 358/191.1
4,897,727 1/1990 Richards ................... 358/188
5,166,798 11/1992 Cho ........................ 358/188

Primary Examiner—John K. Peng
Attorney, Agent, or Firm—Wenderoth, Lind & Ponack

[57] ABSTRACT

A television signal receiving apparatus receives a new standard television broadcasting signal in an environment in which conventional standard television broadcasting signals are present. A first tuner coupled to a first antenna extracts a first television signal which contains a new standard television signal and a conventional standard television signal of the specific channel at a first ratio, and a second tuner coupled to a second antenna extracts a second television signal which contains the new standard television signal and the conventional standard television signal of the specific channel at a second ratio. In an operation unit, a multiplier multiples the second television signal by a predetermined coefficient, and a subtracter subtracts an output signal of the multiplier from the first television signal. An output signal of the subtracter becomes the new standard television signal when the coefficient has a specific value.

17 Claims, 4 Drawing Sheets

TELEVISION SIGNAL RECEIVING APPARATUS

BACKGROUND OF THE INVENTION

1. Field of the Invention

The present invention relates to a television signal receiving apparatus for receiving a new standard television signal in an environment in which both a broadcasting wave of the new standard television signal and a broadcasting wave of the conventional standard television signal exist.

2. Description of the Prior Art

The current color television systems for the terrestrial broadcasting are the NTSC system, the PAL system and the SECAM system. On the other hands, various new standard high definition television (HDTV) systems for satellite broadcasting and terrestrial broadcasting have been proposed and under development. In Japan and the U.S., the frequency bands allocated for the terrestrial television broadcasting are almost occupied by the channels of the current NTSC system. Accordingly, it is difficult to allocate adequate frequency band for the new standard broadcasting as far as the conventional standard broadcasting exists. So, to realize the new standard broadcasting in the environment in which the conventional standard broadcasting exists, it would be necessary to allocate the channels which are allocated for the conventional broadcasting also for the new standard broadcasting in different service areas. That is, a channel which is not used for the conventional broadcasting in an area (now, adjacent channels are not used in one area so as to avoid intermodulated interferences) may be allocated for the new standard broadcasting in the area. In this case, it is necessary to make the transmitting power of the new standard broadcasting to be small so as not to cause interference in a conventional standard broadcasting signal of the same channel which is broadcasted in, for example, an adjacent area.

In this case, however, there arises an issue of difficulty for a television receiver which is designed for receiving the new standard broadcasting signal to adequately receive the new standard broadcasting wave which has a small power under presence of the conventional broadcasting wave.

SUMMARY OF THE INVENTION

Accordingly, it is an object of the present invention to provide a television signal receiving apparatus which is capable of receiving a new standard television broadcasting signal in an environment in which the conventional television broadcasting signals are present.

To achieve this object, a television signal receiving apparatus according to the present invention comprises: first and second antennas for receiving broadcasting waves of new standard television signals and conventional standard television signals; a first tuner coupled to the first antenna for extracting a first television signal which contains a new standard television signal of a specific channel and a conventional standard television signal of the specific channel at a first ratio; a second tuner coupled to the second antenna for extracting a second television signal which contains the new standard television signal of the specific channel and the conventional standard television signal of the specific channel at a second ratio; a control unit for producing a predetermined coefficient; and an operation unit for obtaining the new standard television signal from the first and second television signals and the predetermined coefficient. The operation unit comprises: a multiplier for multiplying the second television signal by the predetermined coefficient; and a subtracter for subtracting an output signal of the multiplier from the first television signal, an output signal of the subtracter being the new standard television signal.

In another aspect of the present invention, this television signal receiving apparatus may further comprise an error detection circuit for detecting an error of the output signal of the operation unit. In this case, the control unit may be responsive to an error detection signal from the error detection circuit for changing the value of the predetermined coefficient. The control unit may gradually change the value of the predetermined coefficient while checking the error detection signal until the error of the output signal of the operation unit is minimized.

In still another aspect of the present invention, the television signal receiving apparatus may further comprise an initial value setting circuit for producing an initial value for the predetermined coefficient and sending the initial value to the control unit. The control unit may first send the initial value as the predetermined coefficient to the operation unit, and then change the value of the predetermined coefficient until the error of the output signal of the operation unit is minimized. It is preferable to store in a memory a final optimum value of the predetermined coefficient as a new initial value for later use.

The operation in the operation unit is for extracting the components of the new standard television signal from the first and second television signals. In other words, the components of the conventional standard television signal which have been received are eliminated at the output of the operation unit. Accordingly, even under presence of the conventional standard broadcasting waves which have a large power, it is possible to receive and reproduce the new standard television signal without interference from the conventional standard television signal.

Other objects, features and advantages of the present invention would be understood from the following description of the preferred embodiments taken in connection with the accompanying drawings in which:

DESCRIPTION OF THE PREFERRED EMBODIMENTS

Figure 1:
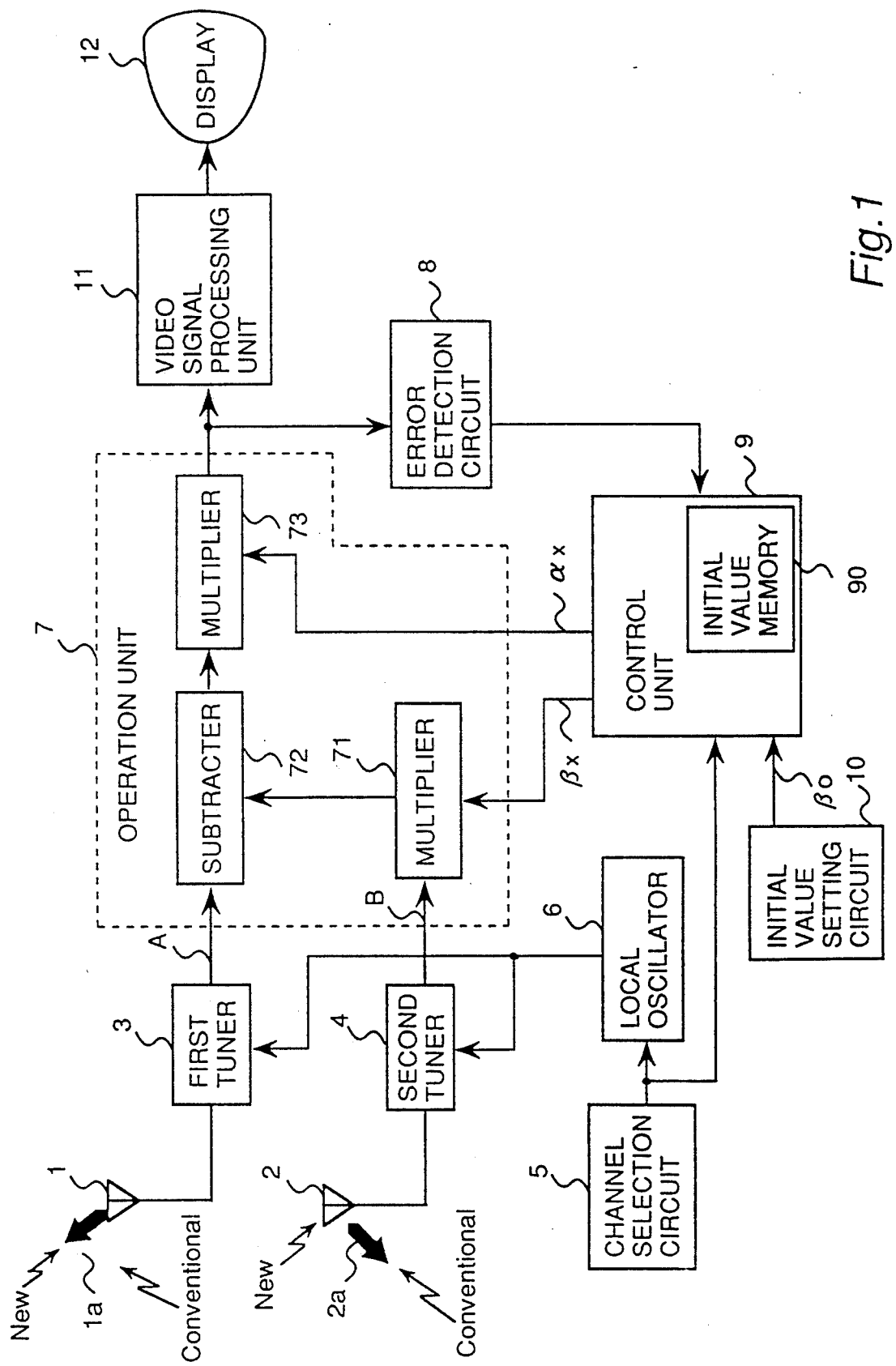
FIG. 1 is a schematic block diagram showing an embodiment of a television signal receiving apparatus of the present invention.

FIG. 1 is a schematic block diagram showing an embodiment of a television signal receiving apparatus of the present invention. At a position where antennas 1 and 2 are located, a broadcasting wave of a new standard television signal transmitted from a new broadcasting station and broadcasting wave of a conventional standard television signal such as the NTSC, PAL or SECAM signal transmitted from a conventional broadcasting station are coming from directions different from each other. The antenna 1 is a directional antenna directed in a direction 1a from which the broadcasting wave of the new standard television signal is transmitted for receiving the new standard broadcasting wave. The antenna 2 is a directional antenna directed in a direction 2a from which the broadcasting wave of the conventional standard television signal is transmitted for receiving the conventional standard broadcasting wave. Even if each of the directional antennas 1 and 2 has a strong directivity, the antenna 1 catches the conventional standard broadcasting wave and the antenna 2 catches the new standard broadcasting wave. That is, the antenna 1 receives the new standard television signal on which the conventional standard television signal is superposed, and the antenna 2 receives the conventional standard television signal on which the new standard television signal is superposed.

The antennas 1 and 2 are coupled to a first tuner 3 and a second tuner 4, respectively. Each of the first and second tuners 3 and 4 is supplied with a local oscillation signal generated by a local oscillator 6. A channel selection circuit 5 which may be responsive to a channel selection switch (not shown) produces a selection signal indicating a desired channel. The local oscillator 6 is responsive to the selection signal for generating a local oscillation signal which has a frequency dependent on the selection signal. The first tuner 3 extracts from the signals received by the antenna 1 a new standard television signal of the desired channel on which a conventional standard television signal of the same channel is superposed, and the second tuner 4 extracts from the signals received by the antenna 2 the conventional standard television signal of the same channel on which the new standard television signal of the same channel is superposed.

Here, supposing that the intensity of the broadcasting wave of the new standard television signal at the antenna located position be X, the intensity of the broadcasting wave of the conventional standard television signal at the antenna located position be Y, the level of the output signal of the first tuner 3 be A, and the level of the output signal of the second tuner be B, the following relations are established:

$$A = X + a \cdot Y \qquad (1)$$

$$B = b \cdot X + c \cdot Y \qquad (2)$$

where a, b and c are coefficients dependent on the directivities and directions of the antennas. Accordingly, X can be obtained by the following formula:

$$X = \alpha \cdot (A - \beta \cdot B), \ \alpha = c/(c - a \cdot b), \ \beta = a/c \qquad (3)$$

This means that the desired new standard television signal can be obtained by multiplying the output signal of the second tuner 4 by a specific coefficient and subtracting the multiplied result from the output signal of the first tuner 3.

This operation is performed in an operation unit 7 by using specific coefficients $\alpha_x$ and $\beta_x$ produced by a control unit 9. In the operation unit 7, a mulipler 71 multiplies the output signal of the second tuner 4 by the coefficient $\beta_x$ to obtain a multiplied signal expressed as $\beta_x \cdot B$. A subtracter 72 subtracts the multiplied signal from the output signal of the first tuner 3 to obtain a difference signal expressed as $A - \beta_x \cdot B$. A multiplier 73 multiplies the difference signal by the coefficient $\alpha_x$ to obtain a signal expressed as $\alpha_x \cdot (A - \beta_x \cdot B)$. This signal, i.e., the output signal of the operation unit 7 becomes a signal corresponding to the new standard television signal on which no components of the conventional standard signal are superposed when the values of the coefficients $\alpha_x$ and $\beta_x$ are appropriate optimum values.

When the values of the coefficients $\alpha_x$ and $\beta_x$ are not the appropriate optimum values, the output signal of the operation unit 7 does not accurately correspond to the new standard television signal. An error detection circuit 8 detects an error of the new standard television signal outputted from the operation unit 7, or checks whether the output signal of the operation unit 7 corresponds to the new standard television signal or not, and send an error detection signal indicative of the detected result to the control unit 9. The control unit 9 checks the error detection signal, and when the output signal of the operation unit 9 does not correspond to the new standard television signal, changes the values of the coefficients $\alpha_x$ and $\beta_x$. This feedback operation is repeated by gradually chaning the values of the coefficients until the output signal of the operation unit 9 becomes corresponding to the new standard television signal. The control unit may be configured by a microcomputer.

The new standard television signal obtained at the output of the operation unit 7 is processed in a video signal processing circuit and displayed by a display device 12, which may be a cathode ray tube, a liquid crystal display device, or any other display device.

In the embodiment shown in FIG. 1, the control unit 9 may not produce the coefficient $\alpha_x$ and the operation unit 7 may not have the multiplier 73 for multiplying the output signal of the subtracter 72 by the coefficient $\alpha_x$. That is, the multiplier 73 may be omitted. For, the information of the output signal of the subtracter 72 and the information of the multiplier 73 are substantially the same except for the signal level (different in level by $\alpha_x$). The level may be adjusted in various manners. For example, an amplifier may be provided after the subtracter 72 or an amplifier may be included in the subtracter 72 or in the video signal processing unit 11. Accordingly, the inherent points according to the present invention are that the control unit 9 may produces the coefficient $\beta_x$, and that the operation unit 7 may comprises the multiplier 71 for multiplying the output signal of the second tuner 4 by the coefficient $\beta_x$ and the subtracter 72 for subtracting the output signal of the multiplier 71 from the output signal of the first tuner 3.

The apparatus shown in FIG. 1 further has an initial value setting circuit 10 which sets an initial value $\beta_0$ of the coefficient $\beta_x$, and sends the initial value to the control unit 9. The control unit 9 uses the initial value $\beta_0$ as the coefficient $\beta_x$ when the television receiving apparatus is operated for the first time after having been connected to the antennas. The initial value setting circuit may be operated when the television receiving apparatus has been set by a service man or the like so as to set an appropriate value which may be determined considering the place where the apparatus is set, or the place where the antennas are located.

The control unit 9 may have therein an initial value memory 90 for storing initial values for the coefficient $\beta_x$. The initial value $\beta_0$ set by the initial value setting circuit 10 may be first stored in the memory 90. Further, the control unit 9 may store the finally obtained appropriate optimum value of $\beta_x$ (the value by which the desired new standard television signal is obtained at the output of the operation unit 7) in the memory 90 as an initial value for next or future use. In this case, the control unit 9 receives from the channel selection circuit 5 the channel number, and stores in the memory 90 the channel number together with the initial value. That is, the memory 90 stores therein a plurality of initial values with the respective channel numbers.

In the embodiment shown in FIG. 1, the first and second tuners 3 and 4 use the same local oscillator 6 in common to obtain low-frequency converted desired channel signals. This is advantageous to make the output signals of the first and second tuners 3 and 4 to be in phase with each other, which is necessary for the operation in the operation unit 7. Also, the phase difference due to the difference of the positions of the first and second antennas can be reduced in the low-frequency converted signals to an error which is neglectable for the operation in the operation unit 7.

Figure 2:
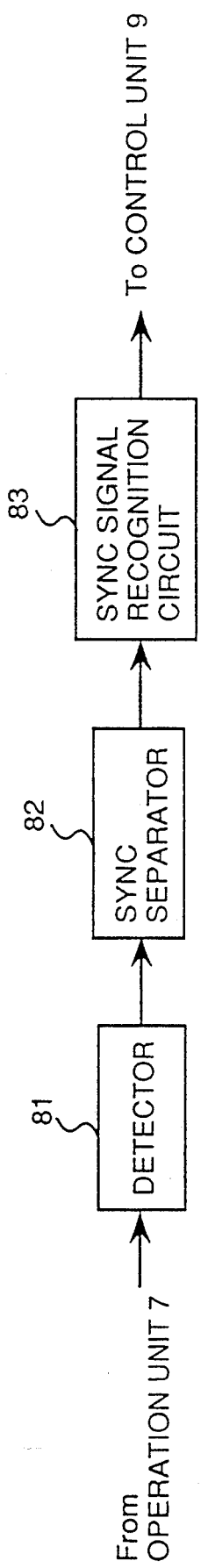
FIGS. 2, 3 and 4 are schematic block diagrams showing examples of error detection circuit used in the embodiments shown in FIGS. 1 and 5.
Figure 3:
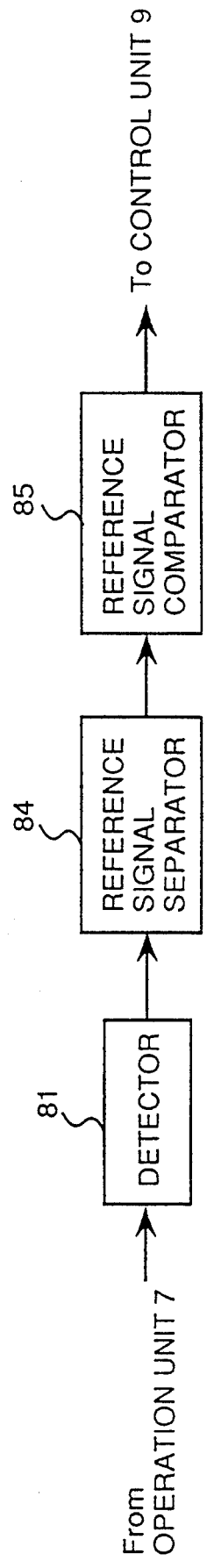
Figure 4:
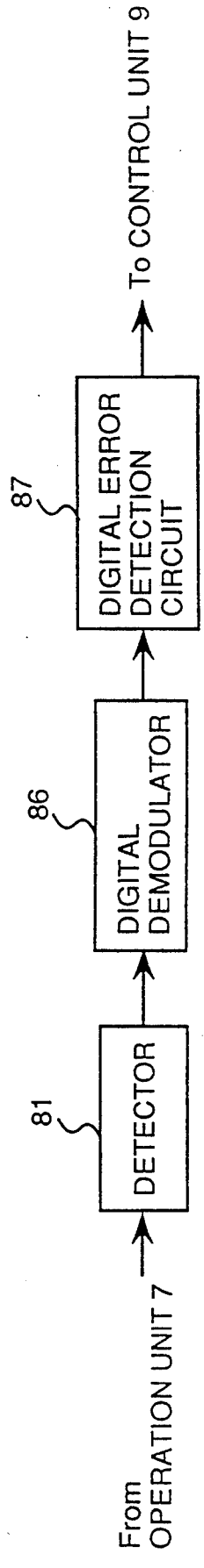

FIGS. 2, 3 and 4 are schematic block diagrams showing examples of the error detection circuit 8 in FIG. 1 and FIG. 5 which will be describe later. Each error detection circuit has a signal detector (i.e., rectifier circuit) 81 for detecting the envelope of the output signal of the operation unit 7. In the error detection circuit shown in FIG. 2, a sync separator 82 separates a sync signal from the output signal of the detector 81. The output signal of the sync separator 82 is checked by a sync signal recognition circuit 83 which recognizes whether the output signal of the sync separator 82 is a desired sync signal. The sync signal recognition circuit 83 sends to the control unit 9 an error detection signal indicative of the recognized result.

The error detection circuit shown in FIG. 3 may be used in such a case that the new standard television signal is superposed with a predetermined reference signal such, for example, as a gohst cancelling reference (GCR) signal. A reference signal separator 84 separates the reference signal from the output signal of the detector 81. A reference signal comparator 85 compares the separated reference signal with a desired reference signal and outputs to the control unit 9 an error detection signal indicative of the comparison result. The error detection circuit shown in FIG. 3 may be used in combination with the error detection circuit shown in FIG. 2.

The error detection circuit shown in FIG. 4 may be used in such a case that the new standard television signal is a modulated digital signal. A digital demodulator 86 demodulates the output signal of the detector 81 to obtain a demodulated digital television signal. A digital error detection circuit 87 detects an error of the demodulated digital television signal from a desired condition for the digital television signal, and sends to the control unit 9 an error detection signal indicative of the detection result. The error detection circuit shown in FIG. 4 may be used in combination with the error detection circuit shown in FIG. 2.

In the above embodiment, the error detection circuit 8 is used for detecting whether or not the new standard television signal is obtained at the output of the operation unit 7 so that the search operation by changing the value of the coefficient $\beta_x$ is performed until the new standard television signal is obtained at the output of the operation unit 7. However, the optimum value of the coefficient $\beta_x$ may be fixed depending on the positions and directions of the antennas 1 and 2 or more roughly depending on the local area in which the antennas are located. For example, in a relatively small town, all television sets used in the town may be pre-set so that the control unit 9 produces a single fixed value of coefficient $\beta_x$. In such circumstances, the error detection circuit 8 may be omitted. Of cource, the initial value setting circuit 10 may be omitted.

Figure 5:
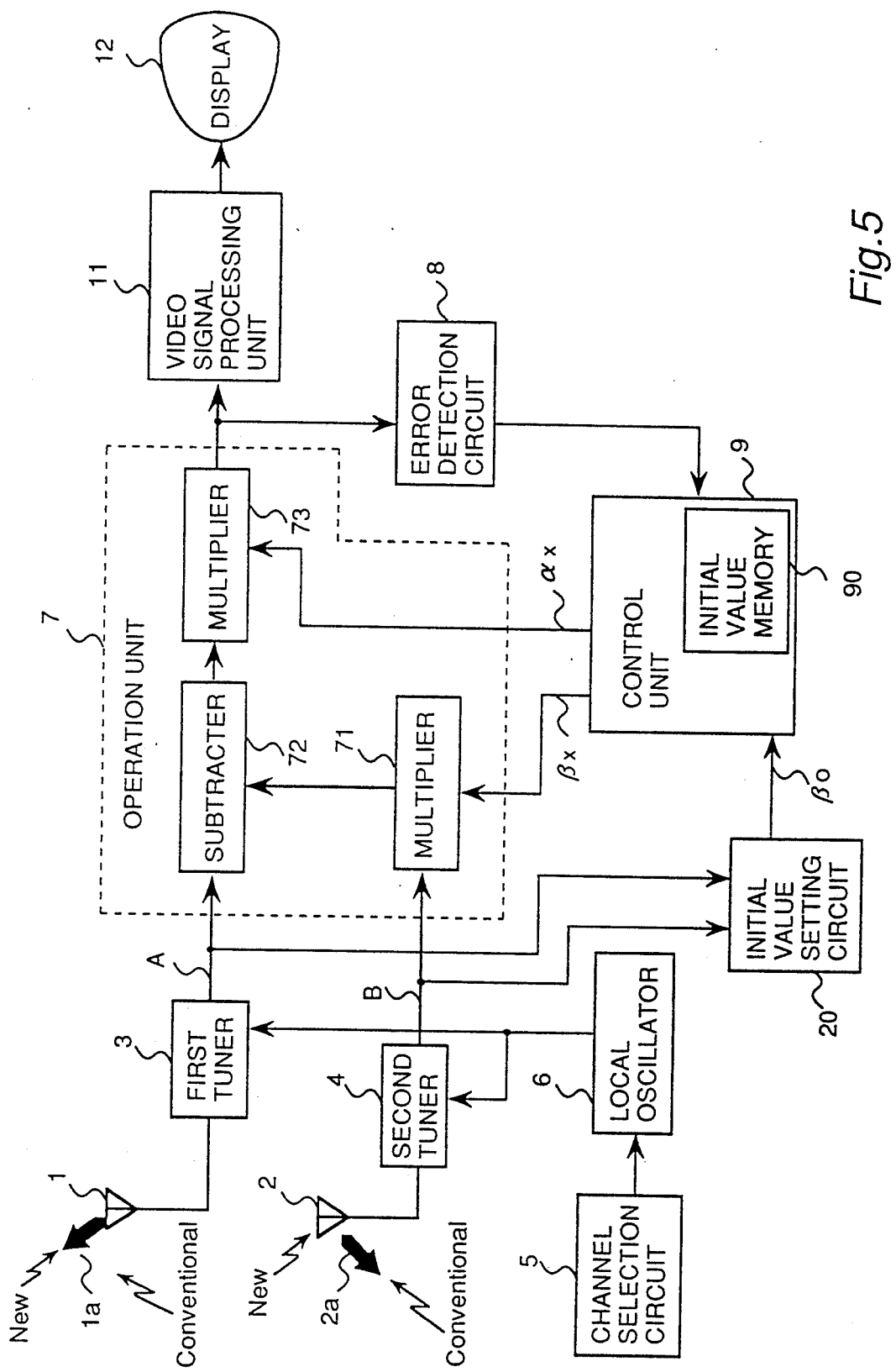
FIG. 5 is a schematic block diagram showing another embodiment of a television signal receiving apparatus of the present invention.
Figure 6:
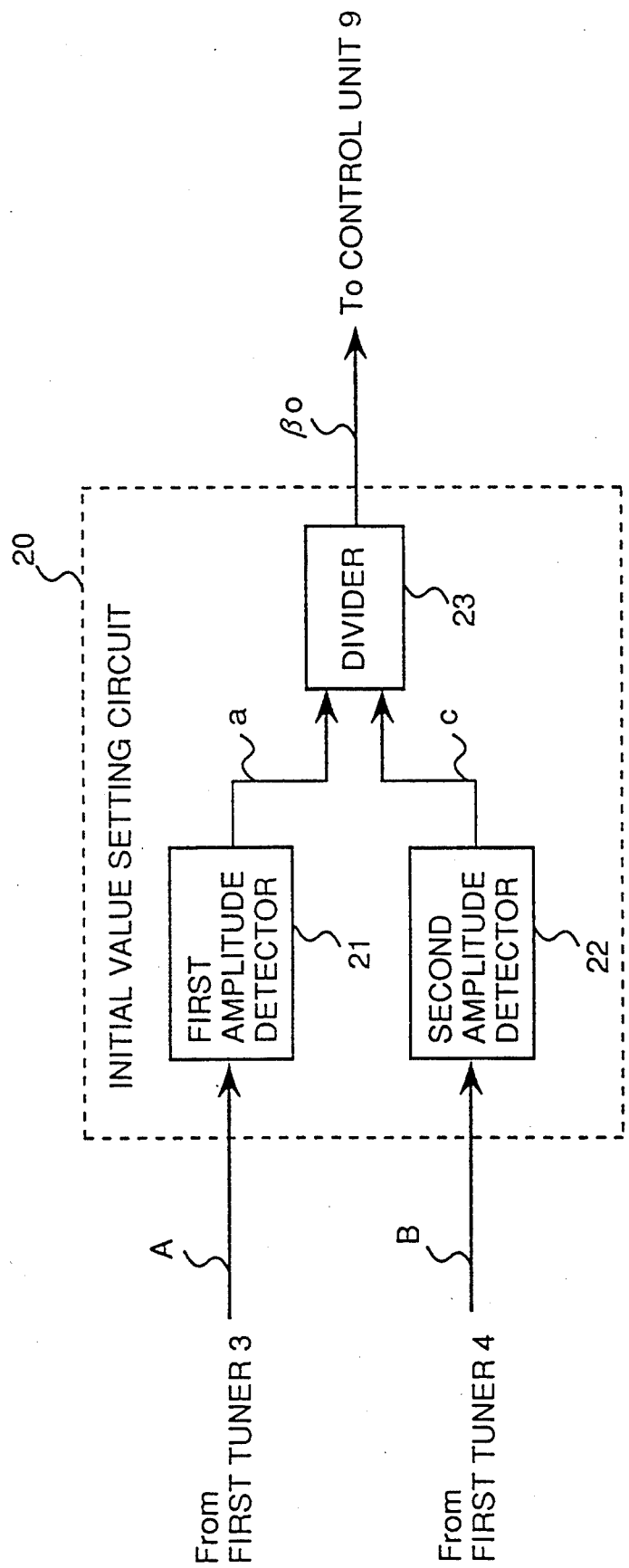
FIG. 6 is a schematic block diagram showing an initial value setting circuit used in the embodiment shown in FIG. 5.

FIG. 5 is a schematic block diagram showing another embodiment of a television signal receiving apparatus of the present invention. In this embodiment, an initial value setting circuit 20 is used in substitution for the initial value setting circuit used in the embodiment shown in FIG. 1. The other parts are the same as those shown in FIG. 1, and will not be described herein. The initial value setting circuit 20 automatically produces the initial value $\beta_0$ for the coefficient $\beta_x$ from the output signals of the first and second tuners 3 and 4. An example of an internal configuration of the initial value setting circuit 20 is shown in FIG. 6. Referring to FIG. 6, a first amplitude detector 21 detects an amplitude of the output signal of the first tuner 3, and a second amplitude detector 22 detects an amplitude of the output signal of the second tuner 4. A divider 23 divides the amplitude detected by the first amplitude detector 21 by the amplitude detected by the second amplitude detector 22. When the new standard broadcasting wave is not present (for example, in a time outside a service time of the new standard broadcasting), the amplitudes detected by the firt and second amplitude detectors 21 and 22 become a·Y and c·Y, respectively, as understood from the equations (1) and (2) shown before. Accordingly, the result of the division operation by the divider 23 becomes $a/c = \beta$ as understood from the equation (3) shown before. In other words, the output of the divider 23 becomes a value which is close to the optimum final value of the coefficient $\beta_x$. Accordingly, it is advantageous to use the output of the initial value setting circuit 20 as the initial value $\beta_0$ for the coefficient $\beta_x$ outputted by the control unit 9 to quickly reaches the optimum state in which the new standard television signal is obtained at the output of the operation unit 7.

The control unit 9 may read the obtained initial value $\beta_0$ from the initial value setting circuit 20 in the time out of the service time of the new standard television broadcasting, and store the read initial value in the initial value memory 90 for later use. The time out of the service time of the new standard television broadcasting may be indicated by an operator by an appropriate means such, for example, as an external switch. However, the control unit 9 can recognize such outof-service time from the error detection signal supplied from the error detection circuit 8. That is, the presence of the new standard television signal is not indicated by the error detection signal even after a trial of sweeping the value of $\beta_x$ in a predetermined sweeping range, the control unit 9 may judge that the new standard television broadcasting is out of service now, and read the output value of the initial value setting circuit as the initial value $\beta_0$.

In the above, preferred embodiments of the present invention are described for the purpose of better understanding of the present invention, but not for limiting the scope of the present invention to the embodiments. It should be understood that various other changes and modifications may be made within the scope of the present invention which is described in the appended claims.

What is claimed is:

1. A television signal receiving apparatus comprising:
   first and second antennas for receiving broadcasting waves of new standard television signals and conventional standard television signals;
   a first tuner coupled to the first antenna for extracting a first television signal which contains a new standard television signal of a specific channel and a conventional standard television signal of the specific channel at a first ratio;
   a second tuner coupled to the second antenna for extracting a second television signal which contains the new standard television signal of the specific channel and the conventional standard television signal of the specific channel at a second ratio;
   a control unit for producing a predetermined coefficient; and
   an operation unit for obtaining the new standard television signal from the first and second television signals and the predetermined coefficient, comprising: a multiplier for multiplying the second television signal by the predetermined coefficient; and a subtracter for subtracting an output signal of the multiplier from the first television signal, an output signal of the subtracter being the new standard television signal.

2. An apparatus according to claim 1, further comprising an error detection circuit for detecting an error of the output signal of the operation unit and for producing an error detection signal indicative of the detected error, wherein the control unit is responsive to the error detection signal for changing the value of the predetermined coefficient so as to minimize the error.

3. An apparatus according to claim 2, further comprising an initial value setting circuit for producing an initial value for the predetermined coefficient and sending the initial value to the control unit.

4. An apparatus according to claim 3, wherein the control unit has a memory for storing the initial value.

5. An apparatus according to claim 4, wherein the control unit stores a final value of the predetermined coefficient when the error is minimized in the memory as a new initial value.

6. An apparatus according to claim 3, wherein the initial value setting circuit comprises a first amplitude detector for detecting an amplitude of an output signal of the first tuner, a second amplitude detector for detecting an amplitude of an output signal of the second tuner, and a divider for dividing an output signal of the first amplitude detector by an output signal of the second amplitude detector, an output signal of the divider being used as the initial value when the new standard television signals are not broadcasted.

7. An apparatus according to claim 2, wherein the error detection circuit comprises a detector for detecting an output signal of the operation unit, a sync separator for separating a sync signal from an output signal of the detector, and a sync signal recognition for recognizing whether the sync signal is a correct sync signal or not and for producing, as the error detection signal, a signal indicative of the recognition result.

8. An apparatus according to claim 2, wherein the new standard television signal contains a specific reference signal, and wherein the error detection circuit comprises a detector for detecting an output signal of the operation unit, a reference signal separator for separating the reference signal from an output signal of the detector, and a reference signal comparator for comparing the detected reference signal with a correct reference signal and for producing, as the error detection signal, a signal indicative of the comparison result.

9. An apparatus according to claim 2, wherein the new standard television signal is a digital demodulated signal, and wherein the error detection circuit comprises a detector for detecting an output signal of the operation unit, a digital modulator for subjecting an output signal of the detector to a digital demodulation, and a digital error detection circuit for detecting an error of an output signal of the digital demodulator and for producing, as the error detection signal, a signal indicative of the detected error.

10. An apparatus according to claim 1, wherein the first and second tuners use in common a local oscillation signal generated by a single local oscillator.

11. A television signal receiving apparatus comprising:
    first and second antennas for receiving broadcasting waves of new standard television signals and conventional standard television signals;
    a first tuner coupled to the first antenna for extracting a first television signal which contains a new standard television signal of a specific channel and a conventional standard television signal of the specific channel at a first ratio;
    a second tuner coupled to the second antenna for extracting a second television signal which contains the new standard television signal of the specific channel and the conventional standard television signal of the specific channel at a second ratio; and
    an operation means for extracting the new standard television signal from the first and second signals by performing an operation expressed as:

$$\alpha_x(A - \beta_x \cdot B)$$

where A and B denote first and second television signals, respectively, and $\alpha_x$ and $\beta_x$ are predetermined coefficients.

12. A television signal receiving apparatus comprising:
    first and second antennas for receiving broadcasting waves of new standard television signals and conventional standard television signals;
    a first tuner coupled to the first antenna for extracting a first television signal which contains a new standard television signal of a specific channel and a conventional standard television signal of the specific channel at a first ratio;
    a second tuner coupled to the second antenna for extracting a second television signal which contains the new standard television signal of the specific channel and the conventional standard television signal of the specific channel at a second ratio;
    a control unit for producing first and second predetermined coefficients; and
    an operation unit for obtaining the new standard television signal from the first and second television signals and the first and second predetermined coefficients, comprising: a first multiplier for multiplying the second television signal by the first predetermined coefficient; a subtracter for subtracting an output signal of the multiplier from the first television signal, and a second multiplier for multiplying an output signal of the subtracter by the second predetermined coefficient, an output signal of the second multiplier being the new standard television signal.

13. An apparatus according to claim 12, further comprising an error detection circuit for detecting an error of the output signal of the operation unit and for producing an error detection signal indicative of the detected error, wherein the control unit is responsive to the error detection signal for changing the value of the predetermined coefficient so as to minimize the error.

14. An apparatus according to claim 13, further comprising an initial value setting circuit for producing an initial value for the first predetermined coefficient and sending the initial value to the control unit.

15. An apparatus according to claim 14, wherein the control unit has a memory for storing the initial value.

16. An apparatus according to claim 15, wherein the control unit stores a final value of the predetermined coefficient when the error is minimized in the memory as a new initial value.

17. An apparatus according to claim 14, wherein the initial value setting circuit comprises a first amplitude detector for detecting an amplitude of an output signal of the first tuner, a second amplitude detector for detecting an amplitude of an output signal of the second tuner, and a divider for dividing an output signal of the first amplitude detector by an output signal of the second amplitude detector, an output signal of the divider being used as the initial value when the new standard television signals are not broadcasted.

* * * * *